US012283112B2

United States Patent
Li et al.

(10) Patent No.: US 12,283,112 B2
(45) Date of Patent: Apr. 22, 2025

(54) AUTOMATIC EVALUATION OF THREE-DIMENSIONAL VEHICLE PERCEPTION USING TWO-DIMENSIONAL DEEP NEURAL NETWORKS

(71) Applicants: Dalong Li, Troy, MI (US); Rohit S Paranjpe, Rochester Hills, MI (US); Benjamin J Chappell, Hummelstown, PA (US)

(72) Inventors: Dalong Li, Troy, MI (US); Rohit S Paranjpe, Rochester Hills, MI (US); Benjamin J Chappell, Hummelstown, PA (US)

(73) Assignee: FCA US LLC, Auburn Hills, MI (US)

( * ) Notice: Subject to any disclaimer, the term of this patent is extended or adjusted under 35 U.S.C. 154(b) by 400 days.

(21) Appl. No.: 17/881,111

(22) Filed: Aug. 4, 2022

(65) Prior Publication Data

US 2024/0046657 A1 Feb. 8, 2024

(51) Int. Cl.
| | |
|---|---|
| *G06V 20/58* | (2022.01) |
| *G01S 17/894* | (2020.01) |
| *G01S 17/931* | (2020.01) |
| *G06V 10/75* | (2022.01) |
| *G06V 10/778* | (2022.01) |
| *G06V 10/82* | (2022.01) |
| *G06V 20/64* | (2022.01) |

(52) U.S. Cl.
CPC ............ *G06V 20/58* (2022.01); *G01S 17/894* (2020.01); *G01S 17/931* (2020.01); *G06V 10/751* (2022.01); *G06V 10/778* (2022.01); *G06V 10/82* (2022.01); *G06V 20/647* (2022.01)

(58) Field of Classification Search
CPC ......... G06V 20/56–588; G06V 20/657; G06V 10/778–7796; G06V 10/82; G01S 17/931; G01S 17/894
See application file for complete search history.

(56) References Cited

U.S. PATENT DOCUMENTS

| | | | |
|---|---|---|---|
| 10,906,583 B2 | 2/2021 | Li et al. | |
| 2019/0147221 A1* | 5/2019 | Grabner | G06T 7/75 |
| | | | 382/103 |
| 2019/0303759 A1 | 10/2019 | Farabet et al. | |
| 2019/0370606 A1* | 12/2019 | Kehl | G06V 10/82 |
| 2019/0391582 A1 | 12/2019 | Jung | |
| 2020/0066036 A1* | 2/2020 | Choi | G06T 17/10 |
| 2020/0082180 A1* | 3/2020 | Wang | G06V 20/647 |
| 2021/0174537 A1* | 6/2021 | Ye | G06N 3/045 |

(Continued)

*Primary Examiner* — Sean T Motsinger
(74) *Attorney, Agent, or Firm* — Jeremy J. Klobucar

(57) ABSTRACT

Vehicle perception techniques include applying a 3D DNN to a set of inputs to generate 3D detection results including a set of 3D objects, transforming the set of 3D objects onto a set of images as a first set of 2D bounding boxes, applying a 2D DNN to the set of images to generate 2D detection results including a second set of 2D bounding boxes, calculating mean average precision (mAP) values based on a comparison between the first and second sets of 2D bounding boxes, identifying a set or corner cases based on the calculated mAP values, and re-training or updating the 3D DNN using the identified set of corner cases, wherein a performance of the 3D DNN is thereby increased without the use of expensive additional manually and/or automatically annotated training datasets.

18 Claims, 4 Drawing Sheets

(56) References Cited

U.S. PATENT DOCUMENTS

| | | | |
|---|---|---|---|
| 2021/0331695 A1* | 10/2021 | Ramakrishnan | B60W 60/001 |
| 2022/0300746 A1* | 9/2022 | Park | G01S 17/42 |
| 2022/0383648 A1* | 12/2022 | Vineet | G06V 10/776 |
| 2023/0029900 A1* | 2/2023 | Goel | G06V 20/647 |
| 2023/0033177 A1* | 2/2023 | Goel | G06V 20/58 |
| 2024/0046657 A1* | 2/2024 | Li | G06V 10/778 |
| 2024/0338916 A1* | 10/2024 | Chandler | G06V 10/764 |

* cited by examiner

AUTOMATIC EVALUATION OF THREE-DIMENSIONAL VEHICLE PERCEPTION USING TWO-DIMENSIONAL DEEP NEURAL NETWORKS

FIELD

The present application generally relates to vehicle advanced driver-assistance systems (ADAS) and autonomous driving and, more particularly, to techniques for automatic evaluation of three-dimensional (3D) vehicle perception using two-dimensional (2D) deep neural networks (DNNs).

BACKGROUND

In automated driver-assistance system (ADAS) and autonomous vehicle driving, three-dimensional (3D) object detection is often performed using trained deep neural networks (DNNs) and perception sensor inputs. In order to test and improve the performance of 3D object detection systems, ground truths must be created via manual or automatic labeling. Manual labeling (by human annotators) is slow and expensive, and automated labeling techniques also have drawbacks. Third-party automated labeling services have also shown to be expensive. Another solution is to equip a vehicle with a differential global positioning system (DGPS), but this is only feasible in a controlled environment (i.e., not normal traffic scenarios). Accordingly, while such conventional vehicle perception systems do work well for their intended purpose, there exists an opportunity for improvement in the relevant art.

SUMMARY

According to one example aspect of the invention, a perception system of a vehicle, the perception system being configured for object detection/classification, is presented. In one exemplary implementation, the perception system comprises a set of perception sensors configured to generate a set of inputs indicative of an environment external to the vehicle, and a controller configured to apply a three-dimensional (3D) deep neural network (DNN) to the set of inputs to generate 3D detection results including a set of 3D objects, transform the set of 3D objects onto a set of images as a first set of two-dimensional (2D) bounding boxes, apply a 2D DNN to the set of images to generate 2D detection results including a second set of 2D bounding boxes, calculate mean average precision (mAP) values based on a comparison between the first and second sets of 2D bounding boxes, identify a set or corner cases based on the calculated mAP values, and re-train or update the 3D DNN using the identified set of corner cases, wherein a performance of the 3D DNN is thereby increased without the use of expensive additional manually and/or automatically annotated training datasets.

In some implementations, the set of perception sensors comprises a camera system configured to capture the set of images and a light detection and ranging (LIDAR) system configured to generate a 3D LIDAR point cloud. In some implementations, the set of 3D objects includes a set of 3D bounding boxes in the 3D LIDAR point cloud data. In some implementations, the controller is configured to transform the set of 3D objects onto the set of images as the first set of 2D bounding boxes by projecting the set of 3D bounding boxes onto x and y axes as the first set of 2D bounding boxes.

In some implementations, the second set of 2D bounding boxes are also represented on the x and y axes, and wherein the controller is configured to compare the first and second sets of 2D bounding boxes by separately or independently computing the intersections of the first and second bounding boxes with respect to the x-axis and the y-axis to determine X and Y intersection matrices. In some implementations, the controller is further configured to compare the first and second sets of 2D bounding boxes by calculating 2D intersection matrix as a product of the X and Y intersection matrices.

In some implementations, the controller is configured to calculate the mAP as a ratio or percentage of 2D bounding boxes that intersect and are thus verified. In some implementations, any 2D bounding boxes that do not intersect and are not verified are recalled as identified corner cases. In some implementations, the vehicle is not equipped with a differential global positioning system (DGPS).

According to another example aspect of the invention, a perception method for a vehicle for object detection/classification is presented. In one exemplary implementation, the perception method comprises receiving, by a controller of the vehicle and from a set of perception sensors of the vehicle, a set of inputs indicative of an environment external to the vehicle, applying, by the controller, a 3D DNN to the set of inputs to generate 3D detection results including a set of 3D objects, transforming, by the controller, the set of 3D objects onto a set of images as a first set of 2D bounding boxes, applying, by the controller, a 2D DNN to the set of images to generate 2D detection results including a second set of 2D bounding boxes, calculating, by the controller, mAP values based on a comparison between the first and second sets of 2D bounding boxes, identifying, by the controller, a set or corner cases based on the calculated mAP values, and re-training or updating, by the controller, the 3D DNN using the identified set of corner cases, wherein a performance of the 3D DNN is thereby increased without the use of expensive additional manually and/or automatically annotated training datasets.

In some implementations, the set of perception sensors comprises a camera system configured to capture the set of images and a LIDAR system configured to generate a 3D LIDAR point cloud. In some implementations, the set of 3D objects includes a set of 3D bounding boxes in the 3D LIDAR point cloud data. In some implementations, transforming the set of 3D objects onto the set of images as the first set of 2D bounding boxes comprises projecting, by the controller, the set of 3D bounding boxes onto x and y axes as the first set of 2D bounding boxes.

In some implementations, the second set of 2D bounding boxes are also represented on the x and y axes, and wherein comparing the first and second sets of 2D bounding boxes comprises separately or independently computing, by the controller, the intersections of the first and second bounding boxes with respect to the x-axis and the y-axis to determine X and Y intersection matrices. In some implementations, the method further comprises comparing, by the controller, the first and second sets of 2D bounding boxes by calculating 2D intersection matrix as a product of the X and Y intersection matrices.

In some implementations, the method further comprises calculating, by the controller, the mAP as a ratio or percentage of 2D bounding boxes that intersect and are thus verified. In some implementations, any 2D bounding boxes that do not intersect and are not verified are recalled as identified corner cases. In some implementations, the vehicle is not equipped with a DGPS.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

As previously discussed, there exists an opportunity for improvement in the art of vehicle perception and, more particularly, improving the performance of three-dimensional (3D) vehicle perception without the use of additional expensive manually/automatically labeled training datasets and/or the use of a limited differential global positioning system (DGPS). Like any other DNN, the 3D DNN discussed herein could malfunction or fail (i.e., generate inaccurate results) due to several reasons. For example, in the training dataset, the labels could be created from LIDAR point cloud data. When the objects are far away (i.e., far out in the distance), LIDAR measurements are relatively sparse and/or incorrect. Alternatively, the labels could be created from camera images (e.g., captured by a stereo camera), which may not work well if the scene lacks texture and thus disparity cannot reliably be computed. Or, the training dataset may not be well-balanced or diversified and a certain test image was not represented, and thus the 3D DNN estimate is off or inaccurate.

Accordingly, techniques that significantly simplify the above-described problem while avoiding the drawbacks of the conventional solutions are presented herein. In short, 3D object detection results are compared to and verified by two-dimensional (2D) deep neural network (DNN) object detection results. First, 3D object detection results (from light detection and ranging (LIDAR) and/or camera inputs) are transformed onto 2D images as a first set of 2D bounding boxes. The same 2D images are then fed into 2D DNNs for 2D object detections (more, or a second set of, 2D bounding boxes). The two sets of 2D bounding boxes are then compared to compute a mean average prevision (mAP) value, which is a metric that is used to evaluate the performance of the 3D DNNs. Based on the mAP values, corner cases are identified and used to re-train or improve the 3D DNNs.

Figure 1:
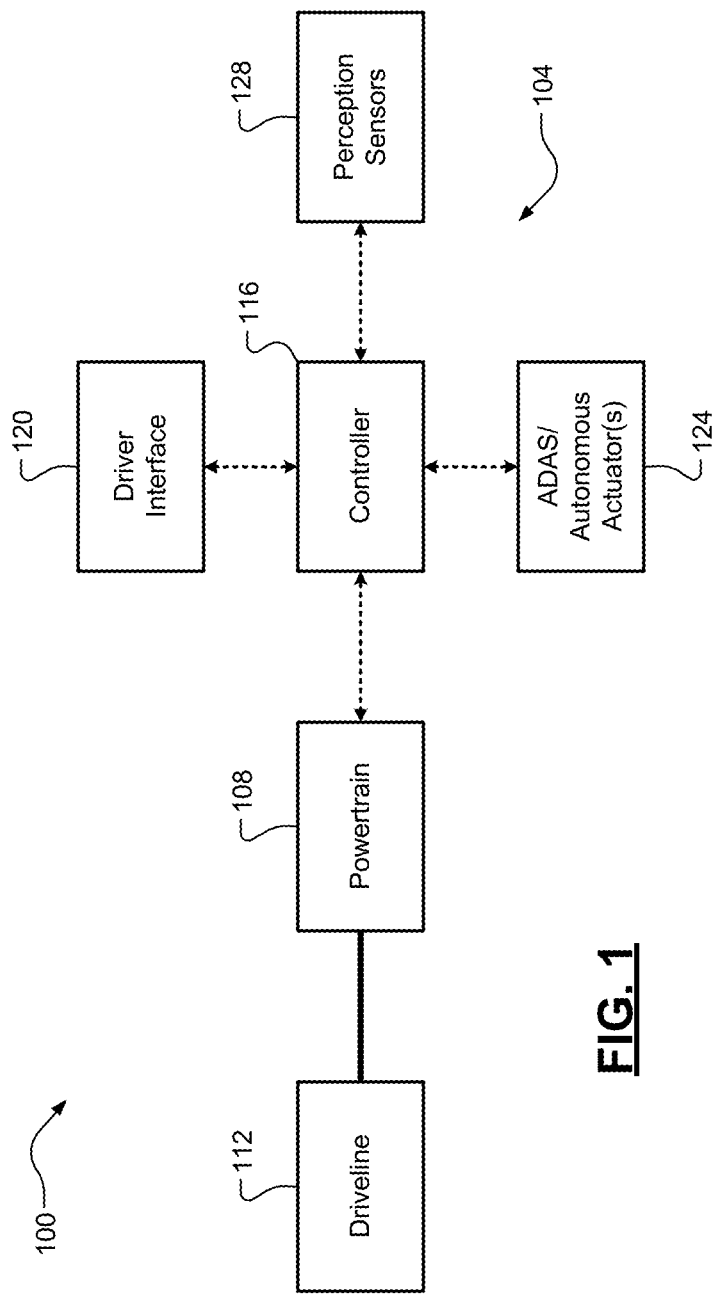
FIG. 1 is a functional block diagram of a vehicle having an example perception system configured to object detection/classification according to the principles of the present application.

Referring now to FIG. 1, a functional block diagram of a vehicle 100 having an example perception system 104 for object detection/classification according to the principles of the present application is illustrated. The vehicle 100 could be any suitable type of vehicle (a conventional engine-powered vehicle, a hybrid electric vehicle, a fully-electrified vehicle, etc.). The vehicle 100 generally comprises a powertrain 108 (e.g., an engine, electric motor(s), or some combination thereof, plus a transmission) configured to generate and transfer drive torque to a driveline 112 for vehicle propulsion. A controller 116 controls operation of the vehicle 100, including controlling the powertrain 108 to generate a desired amount of drive torque based on a driver torque request received via a driver interface 120 (e.g., an accelerator pedal).

The controller 116 is also configured to execute/perform one or more ADAS/autonomous driving features (e.g., up to level 4, or L4 autonomous driving), which generally includes controlling a set of one or more ADAS/autonomous actuator(s) based on information gathered from a plurality of perception sensors 128. Thus, the perception system 108 generally comprises the controller 116, the ADAS/autonomous actuator(s) 124, and the perception sensors 128.

Non-limiting examples of the ADAS/autonomous actuator(s) 124 include an accelerator actuator, a brake actuator, and a steering actuator. In other words, these actuator(s) 124 include actuators for aspects of vehicle control that would typically be handled by a human driver. Non-limiting examples of the perception sensors 128 include one or more cameras configured to capture images of an environment external to the vehicle 100 (e.g., a front-facing camera), a light detection and ranging (LIDAR) system, a radio detection and ranging (RADAR) system, and a map system (a high definition (HD) map system, a global navigation satellite system (GNNS) transceiver, etc.). The concept of "sensor fusion" will be discussed in greater detail below. This involves the fusing of outputs (e.g., detected/classified objects) based on respective confidence values to provide the most accurate/robust outputs or results as possible. In other words, a single system (e.g., a camera-based object detection DNN) may provide adequate results, but these results could be improved even further when combined with similar results from other systems (e.g., LIDAR and an HD map system). The techniques of the present application will now be discussed in greater detail.

Figure 2:
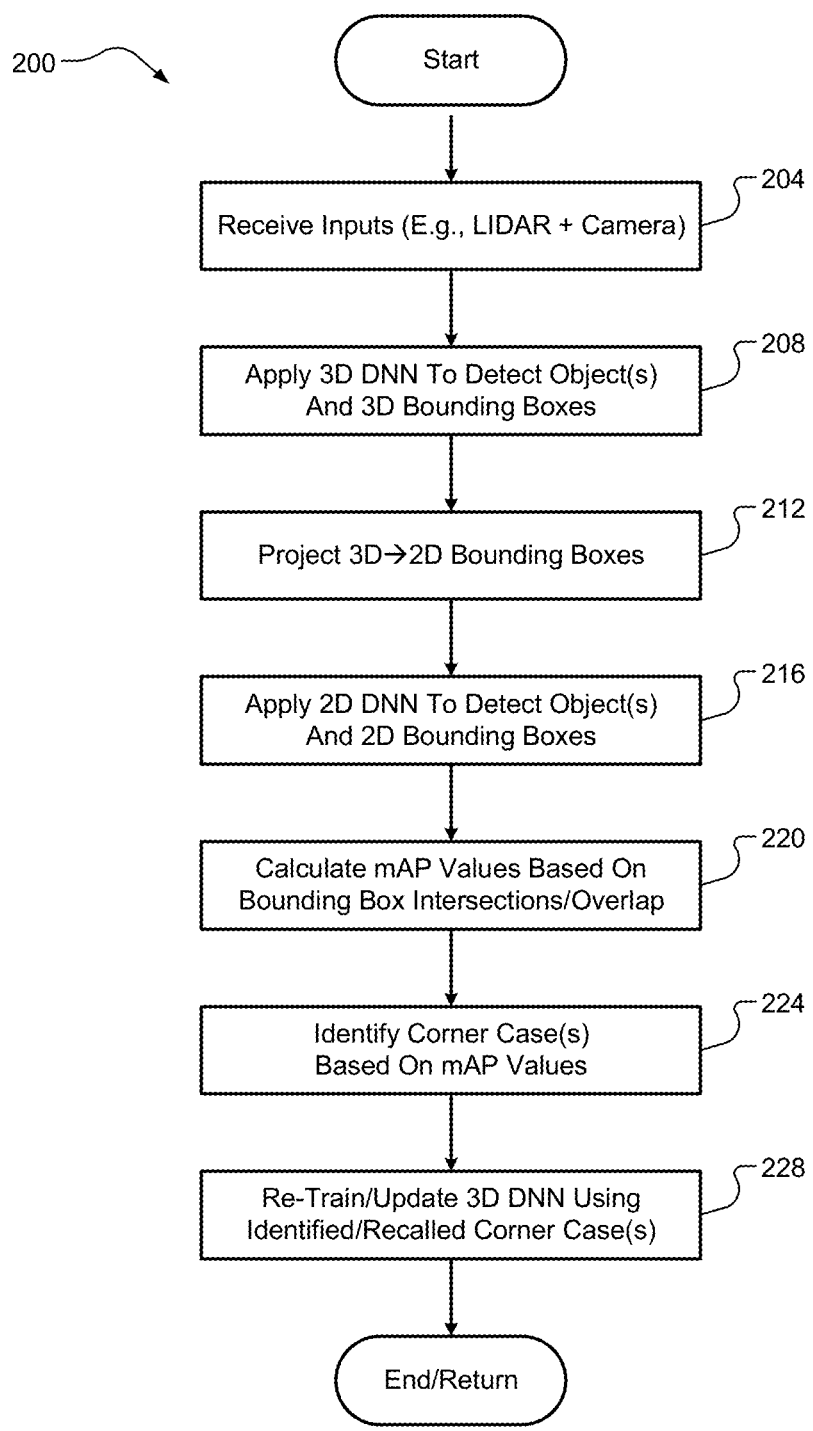
FIG. 2 is a flow diagram of an example vehicle perception method for object detection/classification according to the principles of the present application.
Figure 3A:
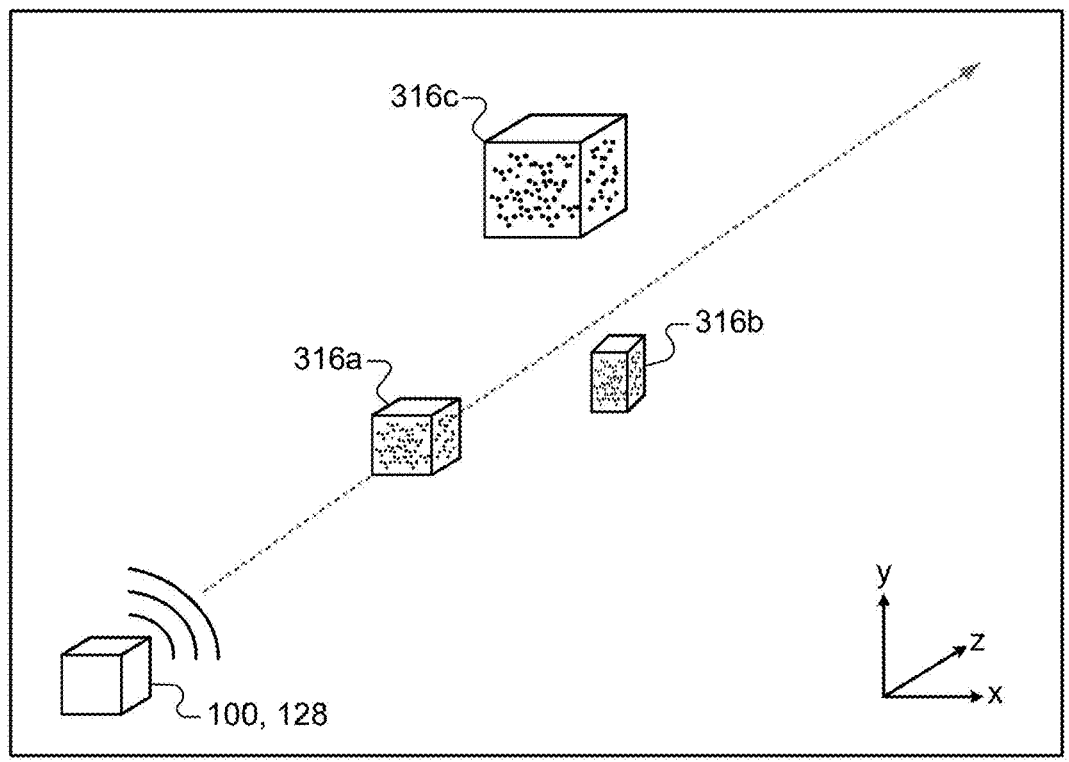
FIGS. 3A-3C are example three-dimensional (3D) light detection and ranging (LIDAR) point clouds and two-dimensional (2D) images having 3D/2D bounding boxes thereon and a 2D (x/y) plot of 2D bounding boxes for intersection determination according to the principles of the present application.
Figure 3B:
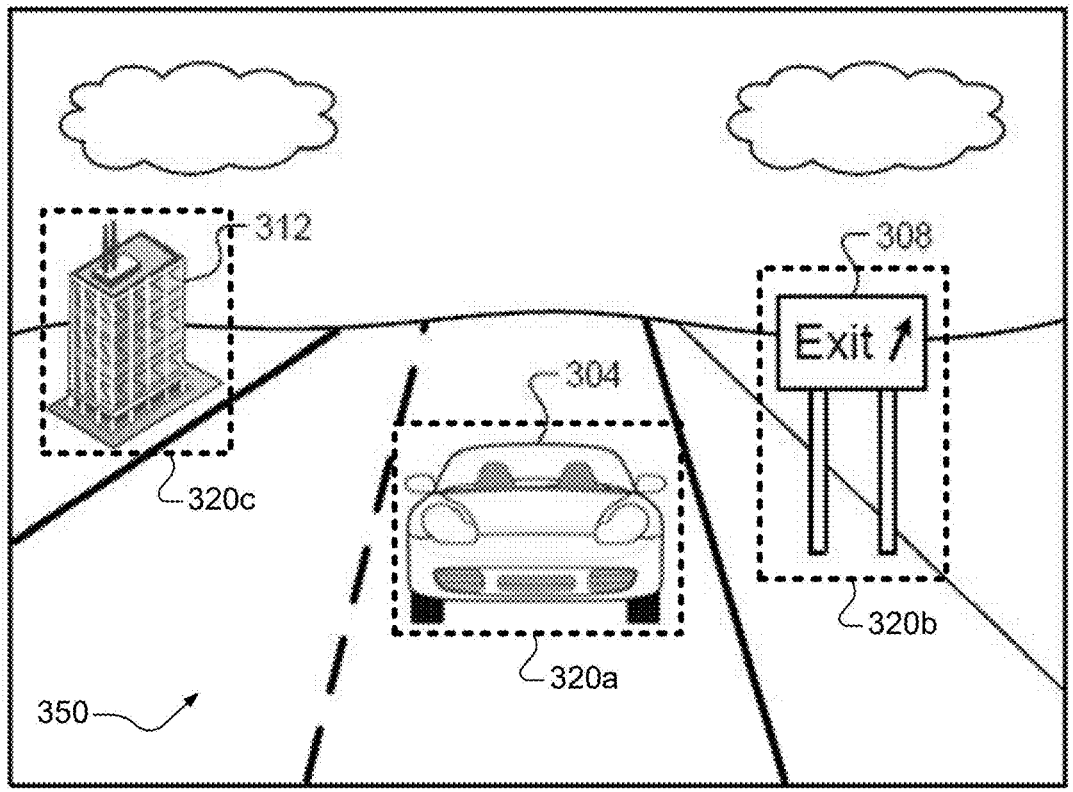
Figure 3C:
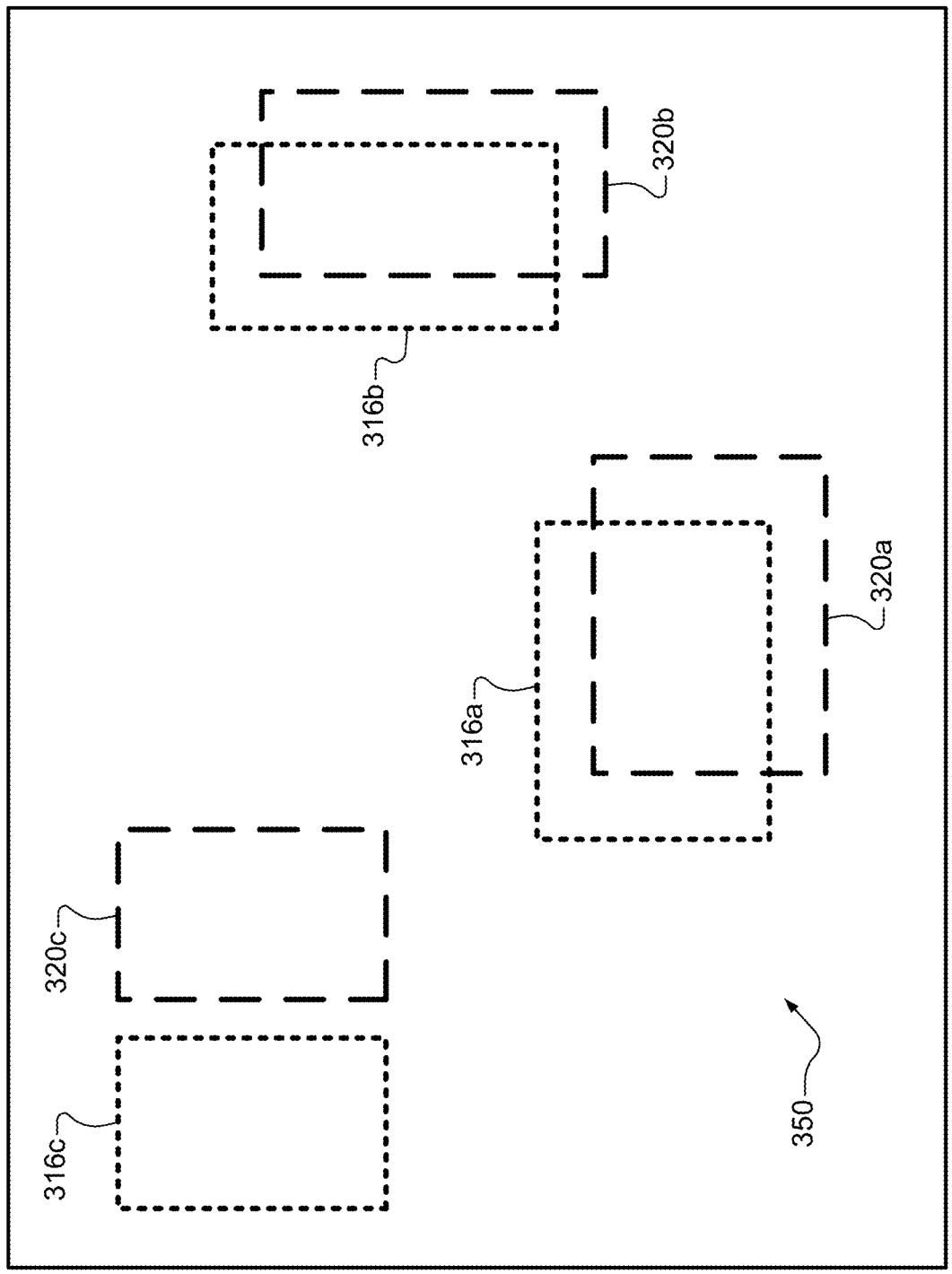

Referring now to FIG. 2 and with also reference to FIGS. 3A-3C, a flow diagram of an example perception (e.g., object detection/classification) method 200 for a vehicle according to the principles of the present application is illustrated. For illustrative/explanatory purposes, vehicle 100 and its components will be referenced in describing the method 200, but it will be appreciated that the method 200 could be applicable to any suitable vehicle. While FIG. 2 illustrates the example perception method 200, FIGS. 3A-3C illustrate 3D LIDAR point clouds and 2D images having 3D/2D bounding boxes thereon and a 2D (x/y) plot of 2D bounding boxes for intersection determination according to the principles of the present application.

At 204, the controller 116 receives from the set of perception sensors 128, a set of inputs indicative of an environment external to the vehicle 100. For example, this set of inputs could include 3D LIDAR point cloud data and a set of images. At 208, the controller 116 applies a 3D DNN to the set of inputs to generate 3D detection results including a set of 3D objects 316a, 316b, 316c (see FIG. 3A). At 212, the controller 116 transforms the set of 3D objects onto a set of images 350 as a first set of 2D bounding boxes 316a, 316b, 316c (see FIGS. 3B-3C). At 216, the controller 116 applies a 2D DNN to the set of images 350 to generate 2D detection results including a second set of 2D bounding boxes 320*a*, 320*b*, 320*c*. As can be seen, these objects/bounding boxes correspond to, from nearest to furthest, another vehicle, an exit sign, and a building.

At 220, the controller 116 calculates mean average precision (mAP) values based on a comparison between the first and second sets of 2D bounding boxes (see FIG. 3C). As shown, the bounding boxes 316*a*/320*a* and 316*b*/320*b* have significant intersection/overlap and thus a high mAP value (close to one), whereas the bounding boxes 316*c*/320*c* have little or not intersection/overlap and thus a low or zero mAP value. This intersection/overlap calculation could include a linear algebra (matrix) based approach where the respective first and second sets of 2D bounding boxes are separately or independently analyzed by computing the intersections (e.g., overlapping x/y cells) of the first and second bounding boxes with respect to the x-axis and the y-axis to determine X and Y intersection matrices, and then a product (e.g., matrix multiplication) could be calculated to compute a 2D intersection matrix. At 224, the controller 116 identifies a set or corner cases based on the calculated mAP values. This could include, for example, identifying cases (e.g., objects) where the mAP values are less than a calibratable threshold (e.g., 0.5, or 50 percent). At 228, the controller 116 re-trains or updates the 3D DNN using the identified set of corner cases to increase a performance of the 3D DNN without the use of expensive additional manually and/or automatically annotated training datasets. The method 200 then ends or returns to 204 for one or more additional cycles (e.g., to further identify corner cases and further re-train/update the 3D DNN for even further improved performance).

It will be appreciated that the term "controller" as used herein refers to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A perception system of a vehicle, the perception system being configured for object detection/classification and comprising:
    a set of perception sensors configured to generate a set of inputs indicative of an environment external to the vehicle; and
    a controller configured to:
        apply a three-dimensional (3D) deep neural network (DNN) to the set of inputs to generate 3D detection results including a set of 3D objects;
        transform the set of 3D objects onto a set of images as a first set of two-dimensional (2D) bounding boxes;
        apply a 2D DNN to the set of images to generate 2D detection results including a second set of 2D bounding boxes;
        calculate mean average precision (mAP) values based on a comparison between the first and second sets of 2D bounding boxes;
        identify a set or corner cases based on the calculated mAP values; and
        re-train or update the 3D DNN using the identified set of corner cases,
        wherein a performance of the 3D DNN is thereby increased without the use of additional manually and/or automatically annotated training datasets.

2. The perception system of claim 1, wherein the set of perception sensors comprises a camera system configured to capture the set of images and a light detection and ranging (LIDAR) system configured to generate a 3D LIDAR point cloud.

3. The perception system of claim 2, wherein the set of 3D objects includes a set of 3D bounding boxes in the 3D LIDAR point cloud data.

4. The perception system of claim 3, wherein the controller is configured to transform the set of 3D objects onto the set of images as the first set of 2D bounding boxes by projecting the set of 3D bounding boxes onto x and y axes as the first set of 2D bounding boxes.

5. The perception system of claim 4, wherein the second set of 2D bounding boxes are also represented on the x and y axes, and wherein the controller is configured to compare the first and second sets of 2D bounding boxes by separately or independently computing the intersections of the first and second bounding boxes with respect to the x-axis and the y-axis to determine X and Y intersection matrices.

6. The perception system of claim 5, wherein the controller is further configured to compare the first and second sets of 2D bounding boxes by calculating 2D intersection matrix as a product of the X and Y intersection matrices.

7. The perception system of claim 6, wherein the controller is configured to calculate the mAP as a ratio or percentage of 2D bounding boxes that intersect and are thus verified.

8. The perception system of claim 7, wherein any 2D bounding boxes that do not intersect and are not verified are recalled as identified corner cases.

9. The perception system of claim 1, wherein the vehicle is not equipped with a differential global positioning system (DGPS).

10. A perception method for a vehicle for object detection/classification, the perception method comprising:
    receiving, by a controller of the vehicle and from a set of perception sensors of the vehicle, a set of inputs indicative of an environment external to the vehicle;
    applying, by the controller, a three-dimensional (3D) deep neural network (DNN) to the set of inputs to generate 3D detection results including a set of 3D objects;
    transforming, by the controller, the set of 3D objects onto a set of images as a first set of two-dimensional (2D) bounding boxes;
    applying, by the controller, a 2D DNN to the set of images to generate 2D detection results including a second set of 2D bounding boxes;
    calculating, by the controller, mean average precision (mAP) values based on a comparison between the first and second sets of 2D bounding boxes;
    identifying, by the controller, a set or corner cases based on the calculated mAP values; and
    re-training or updating, by the controller, the 3D DNN using the identified set of corner cases, wherein a performance of the 3D DNN is thereby increased without the use of additional manually and/or automatically annotated training datasets.

11. The perception method of claim 10, wherein the set of perception sensors comprises a camera system configured to capture the set of images and a light detection and ranging (LIDAR) system configured to generate a 3D LIDAR point cloud.

12. The perception method of claim 11, wherein the set of 3D objects includes a set of 3D bounding boxes in the 3D LIDAR point cloud data.

13. The perception method of claim 12, wherein transforming the set of 3D objects onto the set of images as the first set of 2D bounding boxes comprises projecting, by the controller, the set of 3D bounding boxes onto x and y axes as the first set of 2D bounding boxes.

14. The perception method of claim 13, wherein the second set of 2D bounding boxes are also represented on the x and y axes, and wherein comparing the first and second sets of 2D bounding boxes comprises separately or independently computing, by the controller, the intersections of the first and second bounding boxes with respect to the x-axis and the y-axis to determine X and Y intersection matrices.

15. The perception method of claim 14, further comprising comparing, by the controller, the first and second sets of 2D bounding boxes by calculating 2D intersection matrix as a product of the X and Y intersection matrices.

16. The perception method of claim 15, further comprising calculating, by the controller, the mAP as a ratio or percentage of 2D bounding boxes that intersect and are thus verified.

17. The perception method of claim 16, wherein any 2D bounding boxes that do not intersect and are not verified are recalled as identified corner cases.

18. The perception method of claim 10, wherein the vehicle is not equipped with a differential global positioning system (DGPS).

* * * * *